United States Patent [19]

Peruzzi

[11] Patent Number: 4,708,168

[45] Date of Patent: Nov. 24, 1987

[54] VALVED BODY FOR HERMETIC MOTOR-COMPRESSORS FOR REFRIGERANT FLUIDS

[75] Inventor: Federigo Peruzzi, Turin, Italy

[73] Assignee: Aspera S.r.l., Turin, Italy

[21] Appl. No.: 917,128

[22] Filed: Oct. 9, 1986

[30] Foreign Application Priority Data

Oct. 10, 1985 [IT] Italy .............................. 67857 A/85

[51] Int. Cl.⁴ ............................................. F16K 15/02

[52] U.S. Cl. ............................. 137/543.19; 137/454.4

[58] Field of Search .............. 137/454.4, 454.6, 543.19

[56] References Cited

U.S. PATENT DOCUMENTS

| | | | |
|---|---|---|---|
| 1,998,444 | 4/1935 | Clapp | 137/543.19 |
| 2,599,898 | 6/1952 | Dalrymple | 137/454.4 |
| 4,543,989 | 10/1985 | Lorson | 137/543.19 |

FOREIGN PATENT DOCUMENTS

| | | | |
|---|---|---|---|
| 386966 | 12/1923 | Fed. Rep. of Germany | 137/543.19 |

*Primary Examiner*—Robert G. Nilson
*Attorney, Agent, or Firm*—Sughrue, Mion, Zinn, Macpeak & Seas

[57] ABSTRACT

A valved body for a hermetic motor-compressor for refrigerant fluids, such as a shaft support for a rotary-ring compressor, is constituted by a metal part comprising a wall, such as a flange, which adjoins a compression chamber for the fluid and has a fluid discharge port controlled by an automatic discharge valve. The wall has a through seats and the discharge valve comprises essentially:

a cup-shaped insert of sintered steel, housed in the seat and comprising a peripheral skirt and an end wall located on the side nearer the compression chamber, with a central aperture constituting the discharge port and with an annular sealing rib surround the opening of the port within the cup, a cover applied and fixed to the cup-shaped insert on the outer face of the wall and having outlet openings for the fluid from the cavity of the insert, a disc obturator housed and guided within the insert so as to leave a passage for the fluid between the periphery of the obturator itself and the peripheral skirt of the insert, and cooperating with the sealing rib, and a disc spring interposed between the obturator and the cover for thrusting the obturator against the annular rib.

17 Claims, 10 Drawing Figures

VALVED BODY FOR HERMETIC MOTOR-COMPRESSORS FOR REFRIGERANT FLUIDS

DESCRIPTION

Figure 2:
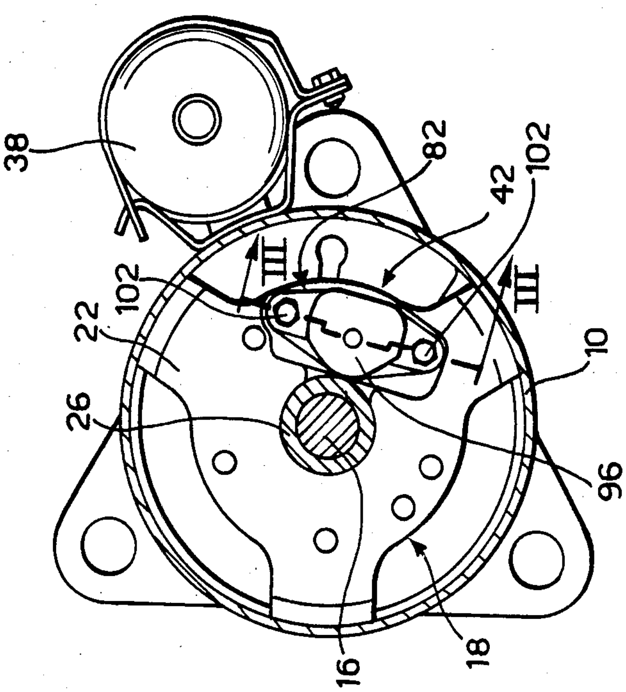

The present invention relates to a valved body for motor-compressors for refrigerant fluids, of the type constituted by a metal casting including a wall which adjoins a compression chamber for the fluid and has a fluid discharge port controlled by an automatic discharge valve.

The invention has been developed for application to a rotary hermetic motor-compressor of the rotary ring type and the technical problem which the invention solves will be explained in relation to this type of compressor, it being understood that the invention can be applied to other types of compressor whenever a similar technical problem arises.

In known rotary-ring hermetic motor-compressors, the casing or stator part of the compressor for the refrigerant fluid includes a pair of flanges between which a so-called cylinder is gripped. The compression chamber in which the ring rotates is defined peripherally by the cylinder and at its ends by the flanges. Each of these flanges is made by casting integrally with a tubular appendage which constitutes a bearing an eccentric located in the compression chamber and coupled to the ring.

Each of the two pieces which include a flange and a tubular appendage will be termed conventionally a shaft support below.

In small rotary-ring compressors, the shaft supports are made to advantage from sintered steel pieces. These pieces are small and can be made with complex shapes. Generally, such small compressors have lateral discharge ports formed in the opposite flanges of the shaft supports and provided with automatic discharge valves for the fluid compressed in the casing of the motor-compressor. These valves include an annular rib formed around the opening of the discharge port as the valve seat, and an obturator constituted by a resilient flap which cooperates therewith. Since the sintered piece including the flange may be made with a complex shape, the annular rib constituting the valve seat may easily be made by sintering.

In relatively large rotary-ring compressors, it is not possible to form the shaft supports from sintered steel. They are for the most part formed from spheroidal cast iron and in some cases from light and alloy. In this instance, it is not easy to cast the annular rib on the flange to act as the valve seat: in the case of the cast iron it would be necessary to form the seat by expensive mechanical working; light alloys do not have the necessary hardness for a valve seat.

In average and large-sized rotary-ring compressors radial discharge ports formed in the cylinder are thus used and have the disadvantages of a need for expensive mechanical working obturator systems for the ports fitted into suitable seats formed in the cylinder.

The same problem is encountered in even relatively small rotary-ring compressors which have a vertical shaft and in which the electric motor overlies the compressor. In these compressors, the lower shaft support may very well be formed in sintered steel since its tubular appendage which acts as a bearing is very short. The upper shaft support, however, must have a relatively long tubular appendage and, with the present state of technology, it is not possible to make this economically fron sintered steel. It is thus formed in cast iron or light alloy, which prevents the formation of an annular seat for an exhaust valve.

The object of the present invention is to provide a shaft support or other valved body, particularly but not exclusively for a rotary-ring hermetic compressor, which has an discharge valve with a relatively complex shape but which is constituted essentially, in an economical manner, by an iron or light alloy casting.

According to the invention, this object is achieved by means of a valved body of the type defined in the first paragraph of the present specification, characterised in that the wall has a through-seat and the discharge valve comprises essentially:

a cup-shaped insert of sintered steel, housed in the seat and comprising a peripheral skirt and an end wall located on the side nearer the compression chamber, with a central aperture constituting the discharge port and with an annular sealing rib surrounding the opening of the port within the cup, a cover applied and fixed to the cup-shaped insert on the outer face of the wall and having outlet openings for the fluid from the cavity of the insert, a disc obturator housed and guided within the insert so as to leave a passage for the fluid between the periphery of the obturator itself and the peripheral skirt of the insert, and cooperating with the sealing rib, and a disc spring interposed between the obturator and the cover for thrusting the obturator against the annular rib.

By virtue of this solution, a shaft support or other body may be made economically by casting and conventional mechanical working. One of the mechanical working operations consists of simple grinding of the seat intended to receive the cup-shaped insert which constitutes the body of the automatic valve. This insert is the only so-called precision piece which, given its small dimensions, may be made economically from sintered steel.

Figure 1:
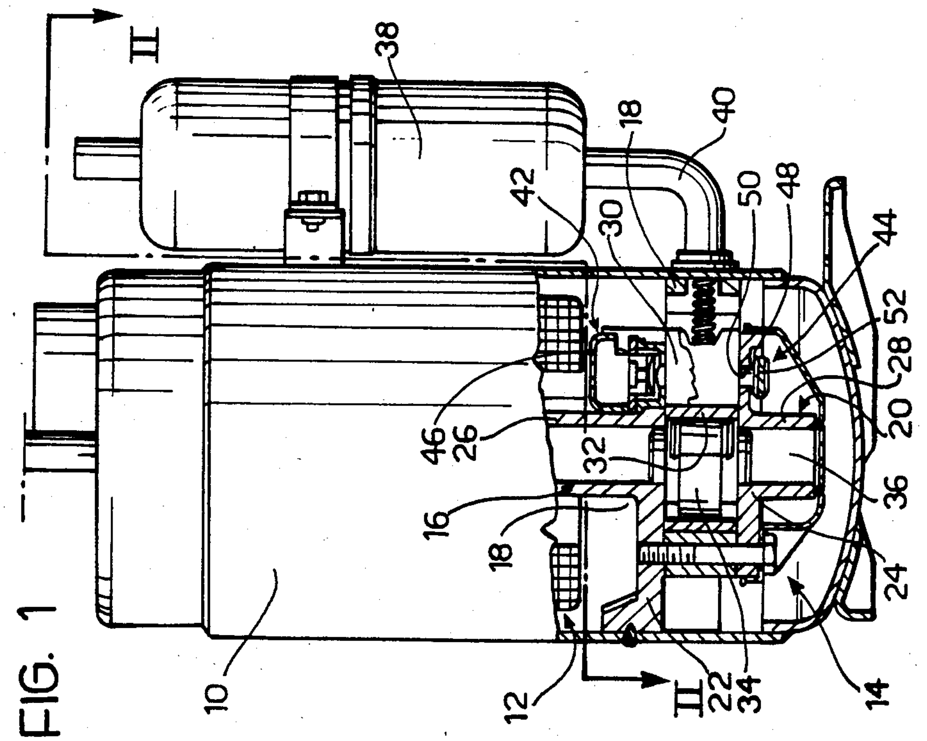

Further characteristics and advantages of the invention will become apparent from a reading of the detailed description which follows with reference to the appended drawings, in which:

FIG. 1 is a partially-sectioned elevational view of a rotary-ring hermetic motor-compressor with a vertical axis.

Figure 3:
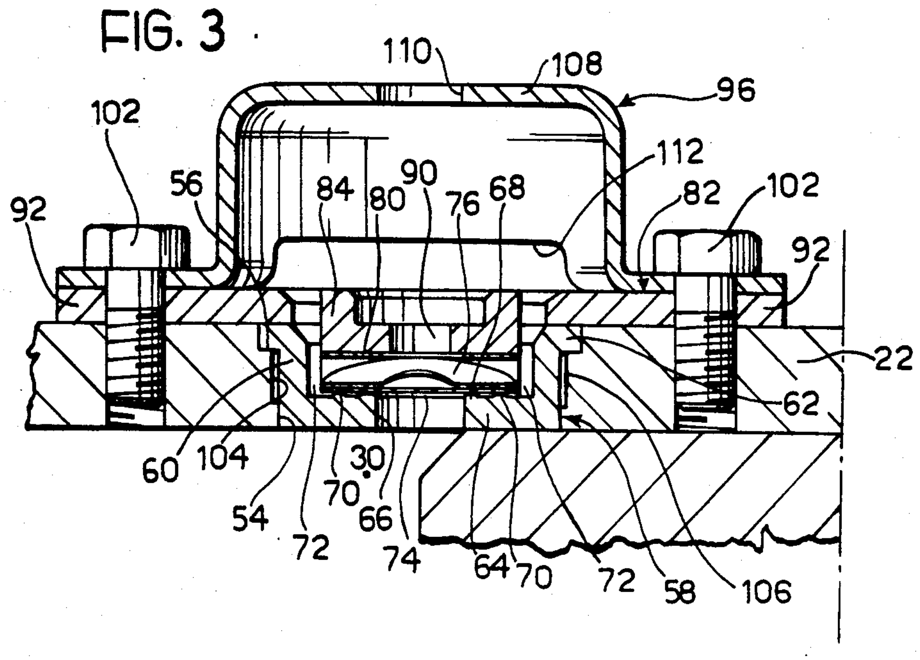
Figure 4:
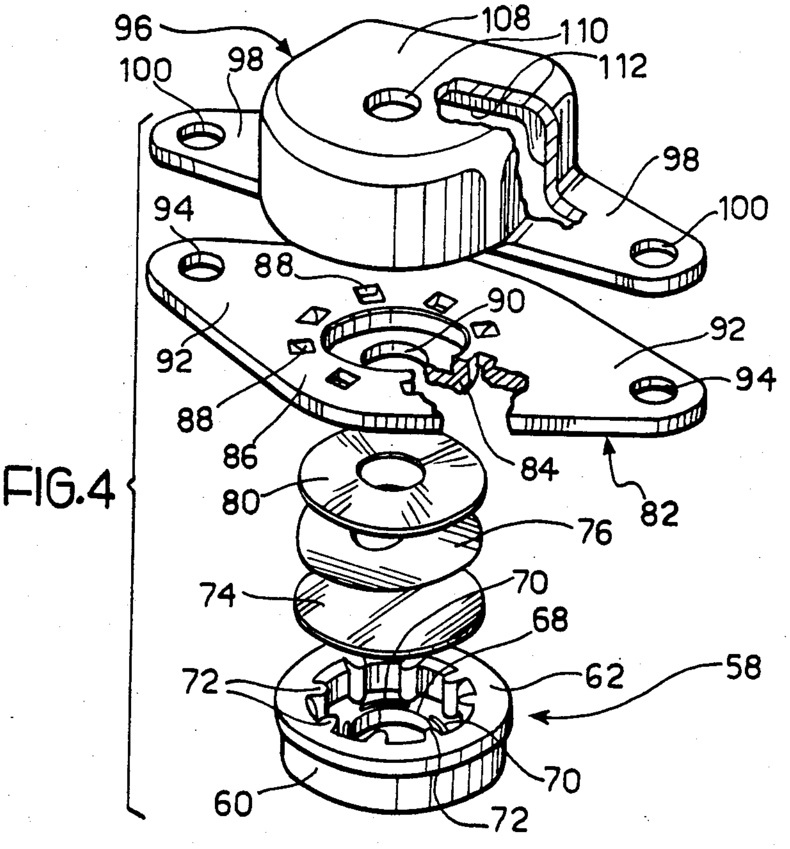
Figure 8:
Figure 7:
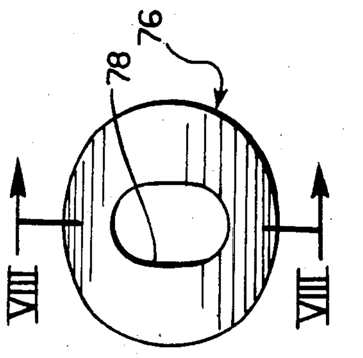
Figure 6:
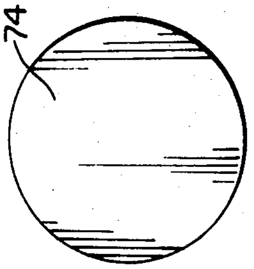
Figure 5:
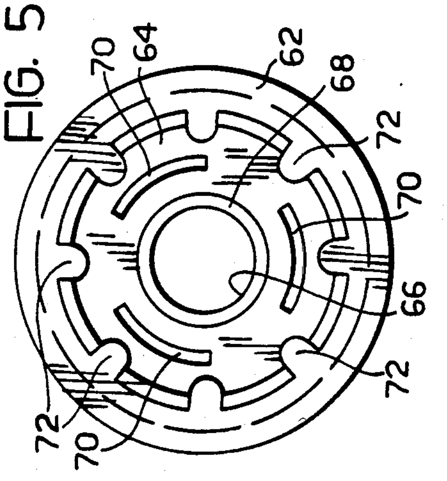
Figure 10:
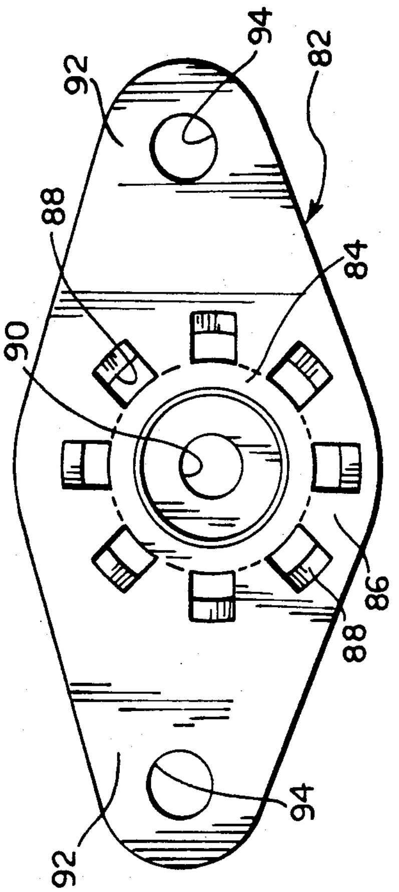
Figure 9:
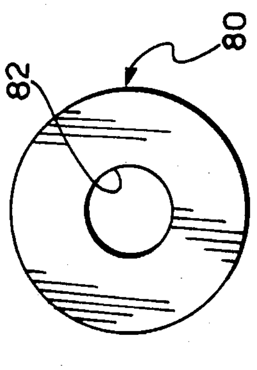

FIG. 2 is a horizontal section taken on the broken line II—II of FIG. 1, FIG. 3 is a vertical section, on an enlarged scale, taken on the line III—III of FIG. 2, illustrating the exhaust valve of the upper shaft support of the compressor, FIG. 4 is an exploded perspective view of this valve, FIG. 5 is a plan view of the cup-shaped insert constituting the body of the valve, FIG. 6 is a plan view of the obturator of the valve, FIG. 7 is a plan view of the repelling spring of the obturator, FIG. 8 is a diametral section of this same spring taken on the line VIII—VIII of FIG. 7, FIG. 9 is a plan view of a wear disc with which the spring cooperates, and FIG. 10 is a plan view of the cover of the valve.

With reference to FIGS. 1 and 2, a rotary-ring type rotary hermetic motor-compressor for refrigerant fluids comprises a hermetic casing 10 containing, among other things, an electric motor 12 and a compressor 14. The common vertical shaft of the motor and the compressor is indicated 16.

The compressor 14 includes a body constituted by a peripheral or cylindrical wall and a pair of upper 18 and lower 20 shaft supports. The shaft supports comprise respective walls or flanges 22 and 24, and respective tubular appendages 26 and 28 formed integrally with the flanges.

The two flanges 22 and 24 clamp the cylinder 18 and define therewith a compression chamber 30 for the refrigerant fluid.

The compression chamber 30 is delimited centrally by a rotary ring 32 coupled with the eccentric 34 of the shaft 16.

The two tubular appendages 26 and 28 respectively constitute the upper and lower bearings for the shaft 16.

The lower appendage 28, which constitutes the bearing for the lower journal 36 of the shaft 16, has a relatively short length corresponding to that of the journal. The body or support for the lower shaft 20 may be formed to advantage from sintered steel due to the short length of the appendage 28.

The tubular appendage 26 of the body or upper support 18 may, as shown in FIG. 1, be relatively long since it must enclose the part of the shaft located within the motor 12. Given the great length of the appendage 26, it is not possible to form the body or shaft support 18 from sintered metal. This support is thus constituted by a spheroidal iron or light alloy casting.

The refrigerant fluid to be compressed is drawn into the chamber 30 from an intake silencer 38 and through a tube 40 which terminates at an automatic intake valve (not shown).

The compressed refrigerant fluid is discharged through a pair of automatic discharge valves, an upper one 42 and a lower one 44, in the space within the casing 10.

In the case shown, the lower valve 44 is of conventional type. It includes a valve seat 46 constituted by an annular rib 48 made by sintering around the opening of an discharge port 50. A flap obturator 52 of known type cooperates with the seat 48.

The details of the upper automatic discharge valve 42 will be described with reference to FIGS. 3 to 9.

With reference to FIG. 3, the wall or flange of the upper shaft support 18 is again indicated 22. A substantially cylindrical through-seat 54 is formed in the flange 22 with an annular upper shoulder 56.

A cup-shaped insert 58 of sintered steel is housed in the seat 54.

With reference to FIGS. 4 and 5, as well as to FIG. 3, the cup-shaped insert 58 comprises a peripheral cylindrical skirt 60 coupled with the seat 54, an upper peripheral collar 62 which rests on the shoulder 56, and an end wall 64. The wall 64, which is located at the side nearest to the compression chamber 30, has a central aperture 66 communicating with the chamber 30 and constituting a discharge port thereof. An annular rib 68 with a rounded profile surrounds the opening of the discharge port 66 within the cup-shaped part. As will be better explained below, the rib 68 constitutes a valve seat.

The wall 64 also has on its inner or upper face a ring of three arcuate ribs 70 having rounded profiles and the same height as the sealing rib 68. The function of these ribs will be specified below.

The skirt 60 of the insert 58 has a ring of internal ribs 72 with rounded profiles, the function of which will also be specified below.

With reference to FIGS. 3, 4 and 6, the obturator of the valve is constituted by a thin steel disc. The disc obturator 74 cooperates with the sealing rib 68. The latter has preferably been coined after sintering of the insert 58 in order to achieve a perfect seal with the obturator 74.

Again to achieve a perfect seal, the obturator 74 also cooperates with the ribs 70 which ensure its planarity in the closed condition of the valve.

With reference to FIGS. 3, 4, 7 and 8, a disc spring 76 constituted by a spring steel sheet is added on to the obturator 74. The spring 76 is arcuate diametrally in the form of a leaf spring. The middle of its extradotal surface bears against the disc obturator 74. The spring 76 is the form of a washer having a central oval aperture 78 with its minor axis coincident with the middle of the arc. By virtue of this configuration of the aperture 78, the spring is given a substantially constant cross-section like that of a uniform-strength beam.

With reference to FIGS. 3, 4 and 8, a wear disc 80, also in the form of a washer and having a central circular aperture 82, is applied to the spring 76. The wear disc or washer 80 is of hard metal or other convenient hard material. The peripheral edge of the spring 76 bears against this disc at the two ends of the arc.

The pack constituted by the obturator 74, the spring 76 and the disc 80 is retained in the cup-shaped insert by a cover 82 (FIGS. 2, 3, 4 and 9) the details of which will be set out below.

For now it suffices to say that the collar 62 of the insert 58 is gripped between the cover 82 and the shoulder 56, and that the cover 82 itself has a central boss 84 which projects into the cavity of the insert 58 between the ribs 72. As will be understood, the spring 76 bears against the boss 84 with the interposition of the wear disc 80. The height or depth of the boss 84 is calibrated so as to preload the spring 76 suitably.

This same pack constituted by the obturator 74, the spring 76 and the disc 80 is guided peripherally by the ribs 72, thus allowing both the obturator 74 and the spring 76 to oscillate in a centered position during operation of the valve.

With reference now to FIGS. 3, 4 and 9, the cover 82 is also formed to advantage from sintered steel and is substantially lozenge-shaped in plan, with rounded corners. The cover 82 thus defines a wide central zone 86 which has the boss 84 in its centre. A ring of discharge ports 88 is formed in the zone 86 around the boss 84, the ports being substantially rectangular in plan with radially outer walls which are bevelled in a diverging sense in order to facilitate the flow of the discharged fluid through the valve.

The boss 84 is also formed with a central circular outlet port 90 which coincides with the aperture 82 in the wear disc 80 and the oval aperture 78 in the spring 76.

The lozenge shape of the cover 82 defines two end zones 92 which are shaped as lugs and have respective fixing holes 94.

The cover 82 has an associated silencer cap 96 of drawn sheet metal or other material, shown in FIGS. 2 to 4. The silencer 96 has a pair of lugs 98 corresponding to the lugs 92 and which have fixing holes 100.

The silencer 96 and the cover 92 are fixed to the flange or wall 22 by means of screws 102, as illustrated in FIGS. 2 and 3.

In fact, the retention of the insert 58 in its seat 54 is preferably not entrusted to the clamping of the cover 92 by the screws 102. In a preferred embodiment the insert 58 is driven into the seat 54.

According to another preferred embodiment, as shown, an annular recess 104 is formed in the peripheral surface of the seat 54 and a glue 106 (FIG. 3), preferably of the so-called "anaerobic" type, is applied to the recess during insertion of the cup part 58 in the seat 54.

Alternatively, the annular recess which contains the glue could be formed in the peripheral wall of the cup 58 or in both the facing peripheral walls of the cup and the seat.

Coming now to the silencer 96, this comprises a central hollow wall or cap 108 which covers the central zone 86 of the cover 82 with its ports 88 and 90.

The cap 108 has its own discharge ports. One of these ports, indicated 110, is located at the apex. Another port, indicated 112, is located in a lateral position. This lateral port 112 is a slot defined between a recess in the peripheral edge of the cap 108 and the cover 92.

It has been found that an arrangement of the discharge ports 110 and 112 such as that described and illustrated is useful for cutting the basic frequency of pulsation of the discharged fluid, as well as multiples of this frequency.

The operation of the valve illustrated and described will be clear to experts in the art. However, for completeness, a brief description will be given below.

Each time the fluid upstream of the valve 42 reaches the discharge pressure, this pressure raises the obturator 74 against the force of the spring 76 and the fluid flows out through the port 66 in a centripetal sense and acts on the pack of elements 74, 76 and 80, passing into the spaces between the ribs 72 and then discharging into the cap 108 through the peripheral ports 88 in the cover 82. Some of the fluid, especially when flow rates are very high, however, returns to the centre of the valve between the obturator 74 and the wear disc 80 and reaches the interior of the cap 108 through the central outlet port 90.

An upper valved shaft support for a ring-type compressor with a vertical shaft has been described and illustrated by way of non-limiting example.

As already stated in the introduction to the present specification, the invention is not limited to this particular application. It is in fact applicable to both upper and lower shaft supports of rotary vertical-shaft compressors, as well as to lateral shaft supports of horizontal-shaft compressors, not only of the rotary-ring type but also of the vaned type, Wankel type, etc. The application of the invention to refrigerant-fluid compressors of more conventional reciprocating types is also foreseen.

In the case of a reciprocating compressor, the valved body could be the head of the cylinder.

It is understood that the scope of the present invention also extends to hermetic motor compressors provided with a shaft support or other valved body according to the invention itself, and to an automatic discharge valve having the characteristics claimed.

What is claimed is:

1. Valved body for motor compressors for refrigerant fluids of the type constituted by a metal casting which includes a wall adjoining a compression chamber for the fluid and has a fluid discharge port controlled by an automatic discharge valve, wherein the wall comprises essentially:

an aperture defining a seat, a cup shaped inset of sintered steel housed in the seat and having a cavity therein defined by a peripheral skirt and an end wall located on the side nearer the compression chamber with a central aperture constituting the discharge port and with an annular sealing rib surrounding the opening of the port within the cup shaped insert, a cover applied and fixed to the cup-shaped inset on the outer face of the wall and having outlet openings for the fluid from the cavity of the insert, a disc obturator housed and guided within the insert so as to leave a passage for the fluid between the periphery of the obturator itself and the peripheral skirt of the insert, and cooperating with the sealing rib, and a disc spring interposed between the obturator and the cover for thrusting the obturator against the annular rib wherein the disc spring is a diametrally arcuate washer, having an extradotal surface the middle of which bears against the disc obturator and the peripheral edge of which bears against the cover at the two ends of the arc, and wherein the cover has a ring of outlet apertures located in correspondence with the periphery of the cavity of the cup-shaped insert and a central outlet aperture coincident with the central aperture of the arcuate washer.

2. Valved body according to claim 1, wherein the end wall of the cup-shaped insert has around the sealing rib a ring of spaced arcuate annular ribs of the same height as the sealing rib for the abutment of the disc obturator when flat in the closed condition of the valve.

3. Valved body according to claim 1, wherein the peripheral skirt of the cup-shaped insert has a ring of internal longitudinal ribs for guiding disc obturator.

4. Valved body according to claim 1, wherein the cup-shaped insert has a peripheral collar around its mouth, which is gripped between the cover and an annular shoulder of the seat.

5. Valved body according to claim 1 wherein an annular recess containing a glue is formed between said peripheral skirt of the insert and said seat.

6. Valved body according to claim 1, wherein in that a wear disc is interposed between the disc spring and the cover.

7. Valved body according to claim 1, wherein the cover has a ring of outlet apertures located in correspondence with the periphery of the cavity of the cup-shaped insert.

8. Valved body according to claim 1, wherein in that the central aperture of the arcuate washer is oval in shape with its minor axis coincident with the middle of the arc.

9. Valved body according to claim 1, wherein a wear disc constituted by a washer is interposed between the disc spring and the cover and the peripheral edge of the spring bears against the washer at the two ends of the arc and the central aperture coincides with the central outlet aperture of the cover.

10. Valved body according to claim 1, wherein the cover has a central boss of a calibrated height which projects into the cavity of the cup-shaped insert and which bears against the spring so as to constitute a calibrated limiter for the opening travel of the obturator.

11. Valved body according to claim 1, wherein the cover is fixed to the wall of the body by screws.

12. Valved body according to claim 11, wherein the cover is substantially lozenge-shaped in plan, with rounded corners, and has a central zone which houses the outlet apertures and two end zones shaped as fixing lugs for fixing the cover to the wall of the body by means of the screws.

13. Valved body according to claim 1, wherein the cover is of sintered steel.

14. Valved body according to claim 1, wherein a silencing cap of sheet metal or the like is placed over the cover and to cover the outlet apertures of the cover and has outlet apertures of its own.

15. Valved body according to claim 11, wherein a silencing cap of sheet metal or the like is provided over the cover to cover the outlet apertures of the cover and has its own outlet apertures and peripheral lugs for fixing to the wall of the body by means of the same screws as fix the cover.

16. Valved body according to claim 14 wherein the cap has an outlet aperture at its apex and a peripheral outlet aperture.

17. Valved body according to claim 16, wherein the peripheral outlet aperture of the cap is a slot defined between a recess of the peripheral edge of the cap itself and the cover.

* * * * *